(12) United States Patent
Ye et al.

(10) Patent No.: US 9,885,905 B2
(45) Date of Patent: Feb. 6, 2018

(54) ARRAY SUBSTRATE AND LIQUID CRYSTAL DISPLAY PANEL

(71) Applicant: SHENZHEN CHINA STAR OPTOELECTRONICS TECHNOLOGY CO., LTD., Shenzhen, Guangdong (CN)

(72) Inventors: Yanxi Ye, Guangdong (CN); Yung-Lun Lin, Guangdong (CN); Zhuming Deng, Guangdong (CN); ChunKai Chang, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 148 days.

(21) Appl. No.: 14/777,997

(22) PCT Filed: Jul. 30, 2015

(86) PCT No.: PCT/CN2015/085577
§ 371 (c)(1),
(2) Date: Sep. 17, 2015

(87) PCT Pub. No.: WO2017/008341
PCT Pub. Date: Jan. 19, 2017

(65) Prior Publication Data
US 2017/0017113 A1    Jan. 19, 2017

(30) Foreign Application Priority Data
Jul. 16, 2015  (CN) .......................... 2015 1 0418777

(51) Int. Cl.
*G02F 1/1335*  (2006.01)
*G02F 1/1333*  (2006.01)
(Continued)

(52) U.S. Cl.
CPC .. *G02F 1/133514* (2013.01); *G02F 1/133345* (2013.01); *G02F 1/134309* (2013.01);
(Continued)

(58) Field of Classification Search
None
See application file for complete search history.

(56) References Cited

U.S. PATENT DOCUMENTS 9,632,351 B2 * 4/2017 Na .................... G02F 1/133514
2004/0109110 A1 6/2004 Kim et al.
(Continued)

FOREIGN PATENT DOCUMENTS

CN        1836188 A    9/2006
CN     101387778 A    3/2009
(Continued)

*Primary Examiner* — Richard Kim
(74) *Attorney, Agent, or Firm* — Ladas & Parry LLP

(57) ABSTRACT

An array substrate is provided, and comprises: a first metal layer, a first insulation layer, a second metal layer, a second insulation layer, a pixel electrode layer, and a color filter layer. The first metal layer comprises light-shading lines. The second metal layer comprises data lines. In interfaces of color resists, lights are shaded by crossing the light-shading lines and the data lines, and by stacking color resists. This can achieve an entire lightproof effect, but is unnecessary to be provided with black matrices.

17 Claims, 2 Drawing Sheets

(51) Int. Cl.
*G02F 1/1362* (2006.01)
*G02F 1/1343* (2006.01)

(52) U.S. Cl.
CPC ............ *G02F 1/136286* (2013.01); *G02F 2001/133302* (2013.01); *G02F 2201/123* (2013.01); *G02F 2201/52* (2013.01)

(56) References Cited

U.S. PATENT DOCUMENTS

| | | | |
|---|---|---|---|
| 2004/0179160 A1* | 9/2004 | Rhee | G02F 1/1362 349/139 |
| 2008/0068536 A1* | 3/2008 | Kim | G02F 1/133371 349/106 |
| 2008/0272997 A1 | 11/2008 | Shin et al. | |
| 2009/0073099 A1 | 3/2009 | Yeates et al. | |
| 2011/0234949 A1* | 9/2011 | Matsui | G02F 1/133512 349/106 |
| 2013/0153905 A1* | 6/2013 | Chen | H01L 27/124 257/59 |
| 2016/0334554 A1 | 11/2016 | Matsui et al. | |

FOREIGN PATENT DOCUMENTS

| | | |
|---|---|---|
| CN | 102201183 A | 9/2011 |
| CN | 102495504 A | 6/2012 |

* cited by examiner

| R | G | B | W | R |   |   |
|---|---|---|---|---|---|---|
|   |   | R | G | B | W | R |
| R | G | B | W | R |   |   |

Fig. 3

| R | G | B | W | R |   |
|---|---|---|---|---|---|
|   | R | G | B | W | R |
| R | G | B | W | R |   |

Fig. 4

ARRAY SUBSTRATE AND LIQUID CRYSTAL DISPLAY PANEL

FIELD OF THE INVENTION

The present invention relates to a technological field of displays, and more particularly to an array substrate and a liquid crystal display panel.

BACKGROUND OF THE INVENTION

In a common HVA (high vertical alignment) display mode, black matrices are designed to shade light in a scan direction and a data direction, and light-shading metal lines are designed in the data direction. The light-shading metal lines are conventionally formed by metals of a first metal layer, and the metals are in the same layer as metals which are used for scan lines, but are not connected with the scan lines. The light-shading metal lines are conventionally connected with an ITO (indium tin oxide) of a CF (color filter) side, and are added with a common electric potential. The light-shading metal lines have two functions: the first function is used to shade light instead of the black matrices when a color filter substrate and an array substrate are assembled as a liquid crystal cell and a shift takes place; and the second function is to shield the electric field produced by the data lines from the ITO.

However, when using white resists, a phenomenon of light leakage may occur in interfaces between the white resists and the other color resists.

Hence, it is necessary to provide a new technical solution to solve the above-mentioned technical problem.

SUMMARY OF THE INVENTION

The object of the present invention is to provide an array substrate and a liquid crystal display panel which can solve a problem that a light leakage occurs in gaps of white resists and other color resists because of the existence of white resists.

For solving the above-mentioned problem, the present invention constructs a technical solution as follows:

An array substrate, which comprises:
a glass substrate;
a first metal layer disposed on the glass substrate and comprising scan lines and light-shading lines, wherein the scan lines are not connected with the light-shading lines;
a first insulation layer disposed on the first metal layer and used for separating the first metal layer from a second metal layer;
the second metal layer disposed on the first insulation layer and comprising data lines;
a second insulation layer disposed on the second metal layer and used for separating the second metal layer from a pixel electrode layer;
the pixel electrode layer disposed on the second insulation layer; and
a color filter layer disposed on the pixel electrode layer and comprising first color resists, second color resists, third color resists, and fourth color resists in order, wherein the first color resists, the second color resists, the third color resists, and the fourth color resists are respectively red color resists, green color resists, blue color resists, and white color resists;
wherein in interfaces of color resists, lights are shaded by crossing the light-shading lines and the data lines, and by stacking the color resists.

Preferably, in the array substrate, in a place where the scan lines corresponding to the interfaces of the red color resists and green color resists, the lights are shaded by stacking the color resists.

Preferably, in the array substrate, in a place where the scan lines correspond to the interfaces of the green color resists and blue color resists, the lights are shaded by stacking the color resists.

Preferably, in the array substrate, in a place where the data lines correspond to the interfaces of the blue color resists and white color resists, the lights are shaded by crossing the light-shading lines and the data lines.

Preferably, in the array substrate, in a place where the data lines correspond to the interfaces of the white color resists and red color resists, the lights are shaded by crossing the light-shading lines and the data lines.

Preferably, in the array substrate, the red color resist of the (N+1)-th line is correspondingly arranged with the blue color resist of the N-th line.

Preferably, in the array substrate, the red color resist of the (N+1)-th line is correspondingly arranged with the green color resist of the N-th line.

An array substrate, which comprises:
a glass substrate;
a first metal layer disposed on the glass substrate and comprising scan lines and light-shading lines;
a first insulation layer disposed on the first metal layer and used for separating the first metal layer from a second metal layer;
the second metal layer disposed on the first insulation layer and comprising data lines;
a second insulation layer disposed on the second metal layer and used for separating the second metal layer from a pixel electrode layer;
the pixel electrode layer disposed on the second insulation layer; and
a color filter layer disposed on the pixel electrode layer and comprising first color resists, second color resists, third color resists, and fourth color resists in order;
wherein in interfaces of color resists, lights are shaded by crossing the light-shading lines and the data lines, and by stacking the color resists.

Preferably, in the array substrate, the first color resists, the second color resists, the third color resists, and the fourth color resists are respectively red color resists, green color resists, blue color resists, and white color resists.

Preferably, in the array substrate, in a place where the scan lines corresponding to the interfaces of the red color resists and green color resists, the lights are shaded by stacking the color resists.

Preferably, in the array substrate, in a place where the scan lines correspond to the interfaces of the green color resists and blue color resists, the lights are shaded by stacking the color resists.

Preferably, in the array substrate, in a place where the data lines correspond to the interfaces of the blue color resists and white color resists, the lights are shaded by crossing the light-shading lines and the data lines.

Preferably, in the array substrate, in a place where the data lines correspond to the interfaces of the white color resists and red color resists, the lights are shaded by crossing the light-shading lines and the data lines.

Preferably, in the array substrate, the red color resist of the (N+1)-th line is correspondingly arranged with the blue color resist of the N-th line.

Preferably, in the array substrate, the red color resist of the (N+1)-th line is correspondingly arranged with the green color resist of the N-th line.

Preferably, in the array substrate, the scan lines are not connected with the light-shading lines.

A liquid crystal display panel, which comprises a first substrate and a second substrate corresponding to each other, wherein a liquid crystal is provided between the first substrate and the second substrate, and wherein the first substrate is an array substrate, which comprises:

a glass substrate;

a first metal layer disposed on the glass substrate and comprising scan lines and light-shading lines;

a first insulation layer disposed on the first metal layer and used for separating the first metal layer from a second metal layer;

the second metal layer disposed on the first insulation layer and comprising data lines;

a second insulation layer disposed on the second metal layer and used for separating the second metal layer from a pixel electrode layer;

the pixel electrode layer disposed on the second insulation layer; and a color filter layer disposed on the pixel electrode layer and comprising first color resists, second color resists, third color resists, and fourth color resists in order;

wherein in interfaces of color resists, lights are shaded by crossing the light-shading lines and the data lines, and by stacking the color resists.

Compared with a traditional technical solution, in the present invention, two means are used to shade light in interfaces of color resists, wherein one is used by crossing light-shading lines and data lines, and the other one is used by stacking color resists. Therefore, the present invention can avoid a problem that a light leakage occurs in gaps between light-shading lines and data lines because of the existence of white resists. By combining the above-mentioned two light-shading means, the present invention can achieve an entire lightproof effect, but is unnecessary to be provided with black matrices. Additionally, by using new pixel arrangement modes in a base of no light leaked in a data direction, a signal delay of the data line is reduced, and the problem that a parasitic capacitance being too large caused by crossing metal lines is solved.

The above-mention contents of the present invention can be best understood by referring to the following detailed description of the preferred embodiments and the accompanying drawings.

DESCRIPTION OF THE DRAWINGS

FIG. 3 is a schematic view of a pixel arrangement according to one embodiment of the present invention; and FIG. 4 is a schematic view of a pixel arrangement according to another one embodiment of the present invention.

DETAILED DESCRIPTION OF THE PREFERRED EMBODIMENTS

The word "exemplary" is used herein to mean serving as an example, instance, or illustration. In addition, the articles "a" and "an" as used in this application and the appended claims may generally be construed to mean "one or more" unless specified otherwise or clear from context to be directed to a singular form.

In the present invention, two means are used to shade light in interfaces of color resists, wherein one is used by crossing light-shading lines and data lines, and the other one is used by stacking color resists. Therefore, the present invention can avoid a problem that a light leakage occurs in gaps between light-shading lines and data lines because an existence of white resists. By combining the above-mentioned two light-shading means, the present invention can achieve an entire lightproof effect, but is unnecessary to be provided with black matrices. Additionally, by using new pixel arrangement modes in a base of no light leaked in a data direction, a signal delay of the data line is reduced, and the problem that a parasitic capacitance being too large caused by crossing metal lines is solved.

The above-mention solutions of the present invention will be described by the following specific embodiments.

Figure 1:
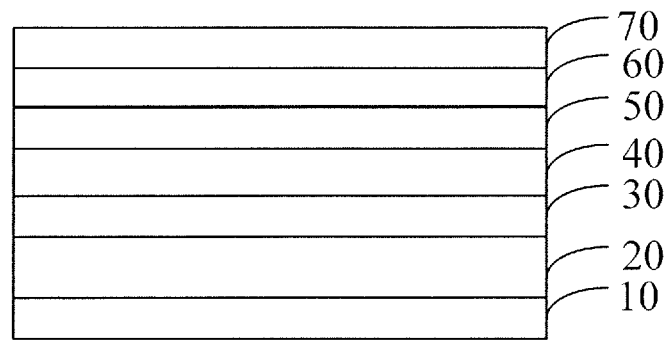
FIG. 1 is a schematic view of an array substrate according to one embodiment of the present invention.

Refer now to FIG. 1, which is a schematic view of an array substrate according to one embodiment of the present invention. For convenient description, only portions which are related to the embodiment of the present invention are shown in the figure.

The array substrate comprises: a glass substrate 10, a first metal layer 20, a first insulation layer 30, a second metal layer 40, a second insulation layer 50, a pixel electrode layer 60, and a color filter layer 70. In the array substrate, the first metal layer 20 is disposed on the glass substrate 10, and comprises scan lines and light-shading lines, wherein it can be understood, the scan lines are not connected with the light-shading lines; the first insulation layer 30 is disposed on the first metal layer 20, and is used for separating the first metal layer 20 from the second metal layer 40; the second metal layer 40 is disposed on the first insulation layer 30, and comprises data lines; the second insulation layer 50 is disposed on the second metal layer 40, and is used for separating the second metal layer 40 from the pixel electrode layer 60; the pixel electrode layer 60 is disposed on the second insulation layer 50; and the color filter layer 70 is disposed on the pixel electrode layer 60, and comprises first color resists, second color resists, third color resists, and fourth color resists in order, wherein the first color resists, the second color resists, the third color resists, and the fourth color resists are respectively red color resists, green color resists, blue color resists, and white color resists.

In the embodiment of the present invention, in interfaces of color resists, lights are shaded by crossing the light-shading lines and the data lines, and by stacking the color resists. That is, the light-shading means of stacking color resists is used to shade light on gate lines which is in the interfaces of RG color resists and GB color resists, and the light-shading means of crossing the light-shading lines and the data lines is used to shade light on gate lines which is in the interfaces of BW color resists and WR color resists. The specific methods are as follows.

Figure 2:
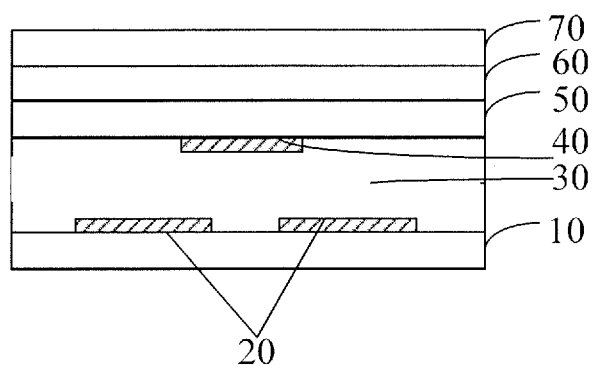
FIG. 2 is a schematic view according to one embodiment of the present invention showing a light-shading means in which a light-shading line and a data line are crossed.

As shown in FIG. 2, in the place where the scan lines corresponding to the interfaces of the red color resists and green color resists, the means of stacking color resists is used to shade light; in the place where the scan lines corresponding to the interfaces of the green color resists and blue color resists, the means of stacking color resists is used to shade light; in the place where the data lines corresponding to the interfaces of the blue color resists and white color resists, the means of crossing the light-shading lines and the data lines is used to shade light; in the place where the data lines corresponding to the interfaces of the white color resists and red color resists, the means of crossing the light-shading line and the data line is used to shade light.

Figures 3, 4:
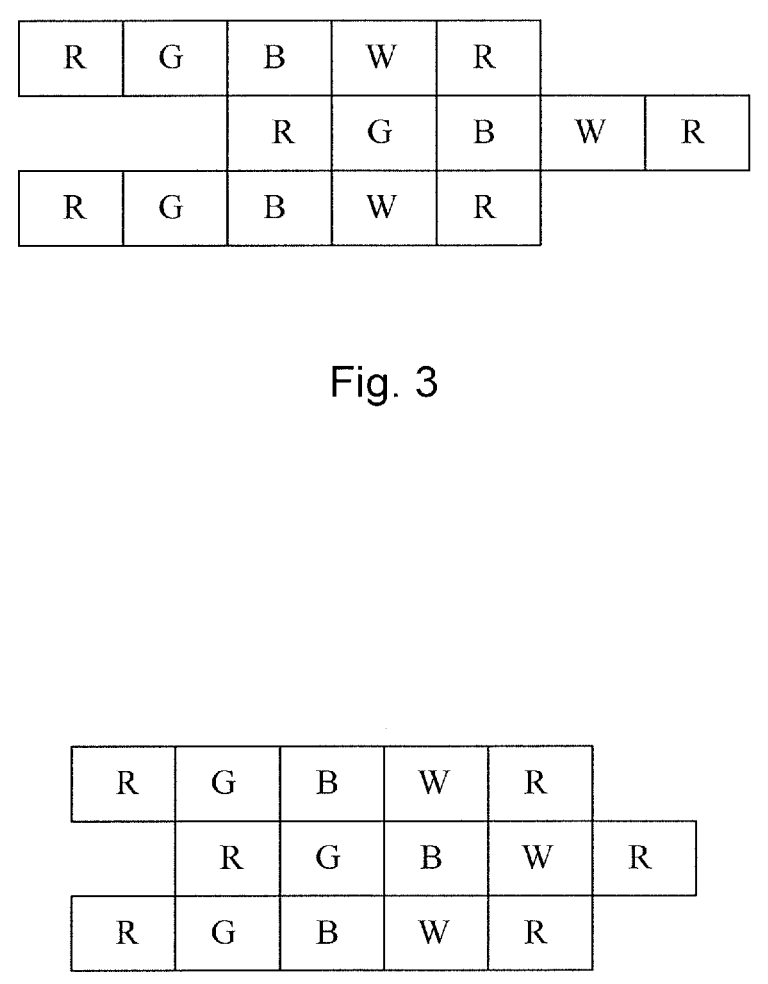

Being one of the embodiment of the present invention, refer now to FIG. 3, which is a schematic view of a pixel arrangement according to one embodiment of the present invention. For avoiding a signal delay of the data line corresponding to the interface of the BW resists is greater than that of the WR resists, a new pixel arrangement mode is used in the present invention, the red color resist of the (N+1)-th line is correspondingly arranged with the blue color resist of the N-th line.

Being one of the embodiment of the present invention, refer now to FIG. 4, which is a schematic view of a pixel arrangement according to another embodiment of the present invention. For avoiding a signal delay of the data line corresponding to the interface of the BW resists is greater than that of the WR resists, a new pixel arrangement mode is used in the present invention, the red color resist of the (N+1)-th line is correspondingly arranged with the green color resist of the N-th line.

Refer now to FIG. 1 to FIG. 4, the present invention further provides a liquid crystal display panel. The liquid crystal display panel comprises a first substrate and a second substrate corresponding to each other, and a liquid crystal is provided between the first substrate and the second substrate, wherein the first substrate is an array substrate.

The array substrate comprises: a glass substrate 10, a first metal layer 20, a first insulation layer 30, a second metal layer 40, a second insulation layer 50, a pixel electrode layer 60, and a color filter layer 70. In the array substrate, the first metal layer 20 is disposed on the glass substrate 10, and comprises scan lines and light-shading lines, wherein it can be understood, the scan lines are not connected with the light-shading lines; the first insulation layer 30 is disposed on the first metal layer 20, and is used for separating the first metal layer 20 from the second metal layer 40; the second metal layer 40 is disposed on the first insulation layer 30, and comprises data lines; the second insulation layer 50 is disposed on the second metal layer 40, and is used for separating the second metal layer 40 from the pixel electrode layer 60; the pixel electrode layer 60 is disposed on the second insulation layer 50; and the color filter layer 70 is disposed on the pixel electrode layer 60, and comprises first color resists, second color resists, third color resists, and fourth color resists in order, wherein the first color resists, the second color resists, the third color resists, and the fourth color resists are respectively red color resists, green color resists, blue color resists, and white color resists.

In the embodiment of the present invention, in interfaces of color resists, lights are shaded by crossing the light-shading lines and the data lines, and by stacking the color resists. That is, the light-shading means of stacking color resists is used to shade light on gate lines which is in the interfaces of RG color resists and GB color resists, and the light-shading means of crossing the light-shading lines and the data lines is used to shade light on gate lines which is in the interfaces of BW color resists and WR color resists. The specific methods are as follows.

As shown in FIG. 2, in the place where the scan lines corresponding to the interfaces of the red color resists and green color resists, the means of stacking color resists is used to shade light; in the place where the scan lines corresponding to the interfaces of the green color resists and blue color resists, the means of stacking color resists is used to shade light; in the place where the data lines corresponding to the interfaces of the blue color resists and white color resists, the means of crossing the light-shading lines and the data lines is used to shade light; in the place where the data lines corresponding to the interfaces of the white color resists and red color resists, the means of crossing the light-shading line and the data line is used to shade light.

Being one of the embodiment of the present invention, refer now to FIG. 3, which is a schematic view of a pixel arrangement according to one embodiment of the present invention. For avoiding a signal delay of the data line corresponding to the interface of the BW resists is greater than that of the WR resists, a new pixel arrangement mode is used in the present invention, the red color resist of the (N+1)-th line is correspondingly arranged with the blue color resist of the N-th line.

Being one of the embodiment of the present invention, refer now to FIG. 4, which is a schematic view of a pixel arrangement according to another embodiment of the present invention. For avoiding a signal delay of the data line corresponding to the interface of the BW resists is greater than that of the WR resists, a new pixel arrangement mode is used in the present invention, the red color resist of the (N+1)-th line is correspondingly arranged with the green color resist of the N-th line.

As mentioned above, in the present invention, two means are used to shade light in interfaces of color resists, wherein one is used by crossing light-shading lines and data lines, and the other one is used by stacking color resists. Therefore, the present invention can avoid a problem that a light leakage occurs in gaps between light-shading lines and data lines because an existence of white resists. By combining the above-mentioned two light-shading means, the present invention can achieve an entire lightproof effect, but is unnecessary to be provided with black matrices. Additionally, by using new pixel arrangement modes in a base of no light leaked in a data direction, a signal delay of the data line is reduced, and the problem that a parasitic capacitance being too large caused by crossing metal lines is solved.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The present invention has been described with preferred embodiments thereof and it is understood that many changes and modifications to the described embodiment can be carried out without departing from the scope and the spirit of the invention that is intended to be limited only by the appended claims.

The invention claimed is:

1. An array substrate, comprising:
   a glass substrate;
   a first metal layer disposed on the glass substrate and comprising scan ones and light-shading lines, wherein the scan lines are not connected with the light-shading lines;
   a first insulation layer disposed on the first metal layer and used for separating the first metal layer from a second metal layer;
   the second metal layer disposed on the first insulation layer and comprising data lines;
   a second insulation layer disposed on the second metal layer and used for separating the second metal layer from a pixel electrode layer;
   the pixel electrode layer disposed on the second insulation layer; and
   a color filter layer disposed on the pixel electrode layer and comprising first color resists, second color resists, third color resists, and fourth color resists in order, wherein the first color resists, the second color resists, the third color resists, and the fourth color resists are respectively red color resists, green color resists, blue color resists, and white color resists;
   wherein in interfaces of color resists, lights are shaded by crossing the light-shading lines and the data lines, and by stacking the color resists.

2. The array substrate according to claim 1, wherein in a place where the scan lines corresponding to the interfaces of the red color resists and green color resists, the lights are shaded by stacking the color resists.

3. The array substrate according to claim 1, wherein in a place where the scan lines corresponding to the interfaces of the green color resists and blue color resists, the lights are shaded by stacking the color resists.

4. The array substrate according to claim 1, wherein in a place where the data lines corresponding to the interfaces of the blue color resists and white color resists, the lights are shaded by crossing the light-shading lines and the data lines.

5. The array substrate according to claim 1, wherein in a place where the data lines corresponding to the interfaces of the white color resists and red color resists, the lights are shaded by crossing the light-shading lines and the data lines.

6. The array substrate according to claim 1, wherein the red color resist of a (N+1)-th line is correspondingly arranged with the blue color resist of a N-th line.

7. The array substrate according to claim 1, wherein the red color resist of a (N+1)-th line is correspondingly arranged with the green color resist of a N-th line.

8. An array substrate, comprising:
   a glass substrate;
   a first metal layer disposed on the glass substrate and comprising scan lines and light-shading lines;
   a first insulation layer disposed on the first metal layer and used for separating the first metal layer from a second metal layer;
   the second metal layer disposed on the first insulation layer and comprising data lines;
   a second insulation layer disposed on the second metal layer and used for separating the second metal layer from a pixel electrode layer;
   the pixel electrode layer disposed on the second insulation layer; and
   a color filter layer disposed on the pixel electrode layer and comprising first color resists, second color resists, third color resists, and fourth color resists in order;
   wherein in interfaces of color resists, lights are shaded by crossing the light-shading lines and the data lines, and by stacking the color resists.

9. The array substrate according to claim 8, wherein the first color resists, the second color resists, the third color resists, and the fourth color resists are respectively red color resists, green color resists, blue color resists, and white color resists.

10. The array substrate according to claim 9, wherein in a place where the scan lines corresponding to the interfaces of the red color resists and green color resists, the lights are shaded by stacking the color resists.

11. The array substrate according to claim 9, wherein in a place where the scan lines corresponding to the interfaces of the green color resists and blue color resists, the lights are shaded by stacking the color resists.

12. The array substrate according to claim 9, wherein in a place where the data lines corresponding to the interfaces of the blue color resists and white color resists, the lights are shaded by crossing the light-shading lines and the data lines.

13. The array substrate according to claim 9, wherein in a place where the data lines corresponding to the interfaces of the white color resists and red color resists, the lights are shaded by crossing the light-shading lines and the data lines.

14. The array substrate according to claim 9, wherein the red color resist of a (N+1)-th line is correspondingly arranged with the blue color resist of a N-th line.

15. The array substrate according to claim 9, wherein the red color resist of a (N+1)-th line is correspondingly arranged with the green color resist of a N-th line.

16. The array substrate according to claim 8, wherein the scan lines are not connected with the light-shading lines.

17. A liquid crystal display panel comprising a first substrate and a second substrate corresponding to each other, wherein a liquid crystal is provided between the first substrate and the second substrate, and wherein the first substrate is an array substrate, which comprises:
   a glass substrate;
   a first metal layer disposed on the glass substrate and comprising scan lines and light-shading lines;
   a first insulation layer disposed on the first metal layer and used for separating the first metal layer from a second metal layer;
   the second metal layer disposed on the first insulation layer and comprising data lines;
   a second insulation layer disposed on the second metal layer and used for separating the second metal layer from a pixel electrode layer;
   the pixel electrode layer disposed on the second insulation layer; and
   a color filter layer disposed on the pixel electrode layer and comprising first color resists, second color resists, third color resists, and fourth color resists in order;
   wherein in interfaces of color resists, lights are shaded by crossing the light-shading lines and the data lines, and by stacking the color resists.

* * * * *